(12) United States Patent
Jung et al.

(10) Patent No.: US 9,185,425 B2
(45) Date of Patent: Nov. 10, 2015

(54) PREDICTION OF A MOVEMENT VECTOR OF A CURRENT IMAGE PARTITION POINTING TO A REFERENCE ZONE THAT COVERS SEVERAL REFERENCE IMAGE PARTITIONS AND ENCODING AND DECODING USING ONE SUCH PREDICTION

(75) Inventors: Joël Jung, Le Mesnil Saint-Denis (FR); Guillaume Laroche, Rennes (FR); Jean Marc Thiesse, Paris (FR)

(73) Assignee: France Telecom, Paris (FR)

( * ) Notice: Subject to any disclaimer, the term of this patent is extended or adjusted under 35 U.S.C. 154(b) by 362 days.

(21) Appl. No.: 13/382,106

(22) PCT Filed: Jun. 25, 2010

(86) PCT No.: PCT/FR2010/051304
§ 371 (c)(1),
(2), (4) Date: Jan. 3, 2012

(87) PCT Pub. No.: WO2011/001077
PCT Pub. Date: Jan. 6, 2011

(65) Prior Publication Data
US 2012/0121021 A1   May 17, 2012

(30) Foreign Application Priority Data
Jul. 3, 2009   (FR) .................................... 09 54623

(51) Int. Cl.
*H04N 7/32*   (2006.01)
*H04N 19/52*  (2014.01)

(52) U.S. Cl.
CPC ..................... *H04N 19/52* (2014.11)

(58) Field of Classification Search
CPC .......... H04N 7/26872; H04N 7/26867; H04N 19/00; H04N 19/52
USPC .................................................... 375/240.16
See application file for complete search history.

(56) References Cited

U.S. PATENT DOCUMENTS 8,265,168 B1 * 9/2012 Masterson et al. ........ 375/240.25
2006/0280247 A1 * 12/2006 Chiou et al. ............. 375/240.16
(Continued)

FOREIGN PATENT DOCUMENTS

EP      1351510 A1    10/2003
WO      2008027192 A2  3/2008
WO      2008082158 A1  7/2008

OTHER PUBLICATIONS

Youn et al., A Fast Motion Vector Composition Method for Temporal Transcoding, May 30, 1999-Jun. 2, 1999, Proceedings of the 1999 IEEE International Symposium on Circuits and Systems, vol. 4, pp. 243-246.*

(Continued)

*Primary Examiner* — Jay Patel
*Assistant Examiner* — Francis G Geroleo
(74) *Attorney, Agent, or Firm* — David D. Brush; Westman, Champlin & Koehler, P.A.

(57) ABSTRACT

A method and apparatus are provided for predicting a movement vector of a current image partition in relation to a movement vector of a reference partition having the same form as the current image partition and belonging to a reference image (IN-1) which is different from the current image and has been pre-cut, following encoding and subsequent decoding, into a plurality of n partitions. One such method includes, when the reference partition covers a set of k reference partitions from among the plurality of n reference image partitions, with k≤n, determining the movement vector of the current image partition from a function of at least one reference movement vector belonging to a set of k reference movement vectors associated respectively with k covered reference partitions.

14 Claims, 3 Drawing Sheets

(56) References Cited

U.S. PATENT DOCUMENTS

| | | | |
|---|---|---|---|
| 2006/0285596 A1* | 12/2006 | Kondo et al. | 375/240.16 |
| 2007/0133683 A1* | 6/2007 | Ohgose | 375/240.16 |
| 2008/0063068 A1 | 3/2008 | Sekiguchi et al. | |
| 2011/0211640 A1* | 9/2011 | Kim et al. | 375/240.16 |

OTHER PUBLICATIONS

Su et al., Fast multiple reference frame motion estimation for H.264/AVC, Mar. 2006, IEEE Transactions on Circuits and Systems for Video Technology, vol. 16, pp. 447-452.*

Dai et al. "Geometry-Adaptive Block Partitioning for Intra Prediction in Image & Video Coding", Thomas Corporate Research, Princeton, New Jersey, pp. VI-85-VI-88, IEEE 2007.

International Preliminary Report on Patentability and Written Opinion dated Feb. 7, 2012 for corresponding International Application No. PCT/FR2010/051304, filed Jun. 25, 2010.

"Advanced Video Coding for Generic Audiovisual Services" International Telecommunictaion Union, ITU-T Rec. H.264 (Mar. 2005).

Laroche et al., "RD Optimized Coding for Motion Vector Predictor Selection", IEEE Transactions on Circuits and Systems for Video Technology, vol. 18, No. 9., Sep. 2008.

Sullivan et al., "Rate-Distortion Optimization for Video Compression" IEEE Signal Processing Magazine, pp. 74-90, Nov. 1998.

Vermeirsch et al., "New Macroblock Bipartitioning Modes for Inter Coding" ITU—Telecommunications Standardization Sector, Study Group 16, question 6, Video Coding Experts Group (VCEG), 34th Meeting: Antalya, Turkey, Jan. 12-13, 2008.

International Search Report and Written Opinion dated Sep. 27, 2010 for corresponding International Application No. PCT/FR2010/051304, filed Jun. 25, 2010.

* cited by examiner

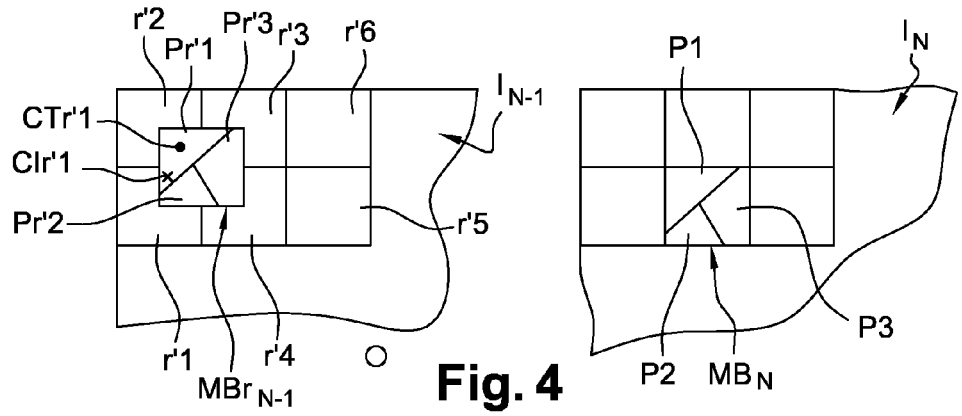
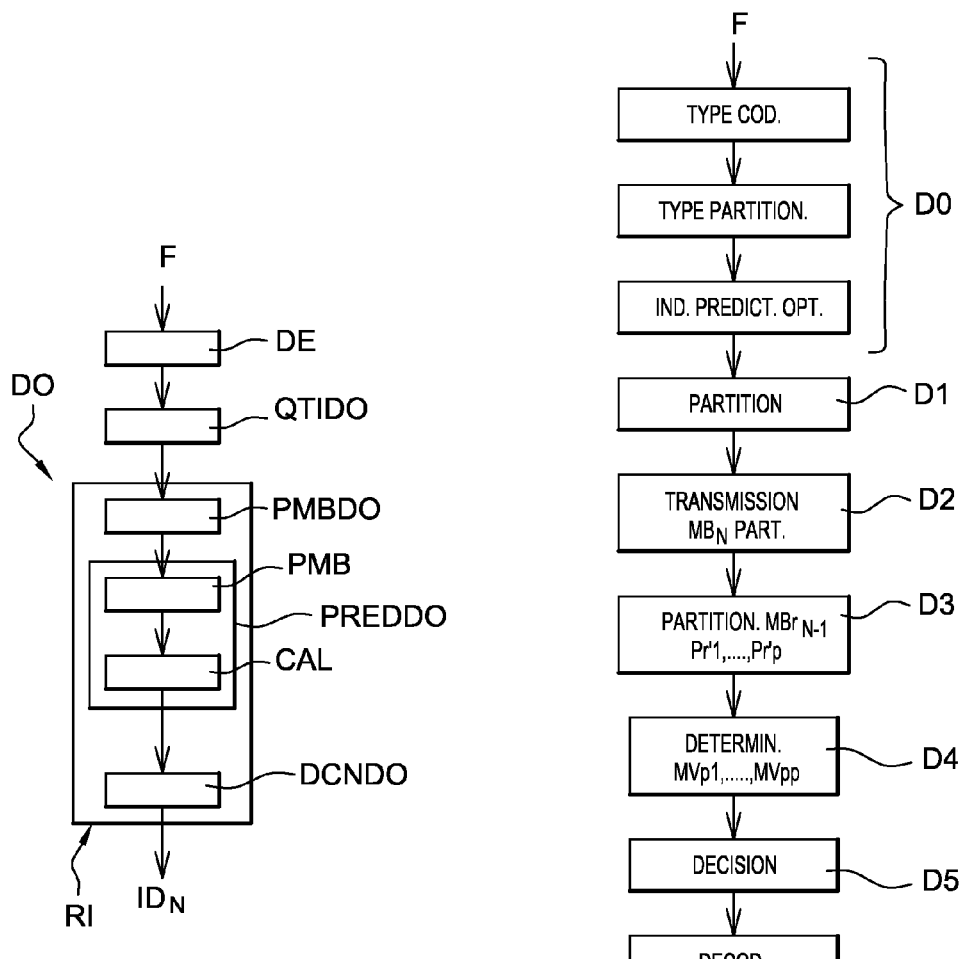
Fig. 4
Fig. 5
Fig. 6

PREDICTION OF A MOVEMENT VECTOR OF A CURRENT IMAGE PARTITION POINTING TO A REFERENCE ZONE THAT COVERS SEVERAL REFERENCE IMAGE PARTITIONS AND ENCODING AND DECODING USING ONE SUCH PREDICTION

CROSS-REFERENCE TO RELATED APPLICATIONS

This Application is a Section 371 National Stage Application of International Application No. PCT/FR2010/051304, filed Jun. 25, 2010, which is incorporated by reference in its entirety and published as WO 2011/001077 on Jan. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains generally to the field of image processing, and more precisely to the competition-based coding and decoding of digital images and of digital image sequences.

BACKGROUND OF THE DISCLOSURE

Several coding and decoding methods exist for the transmission of images. Among the principal types of coding are in particular those such as so-called "intra" coding where an image is coded in an autonomous manner, that is to say without reference to other images, or else so-called "inter" coding which consists in coding a current image with respect to past images so as to express the difference between these images and transmit only this difference.

The methods for coding of the aforementioned type generally comprise a step of predictive coding according to which portions of images, called blocks or macroblocks, of a current image are predicted with respect to other reference blocks or macroblocks, that is to say previously coded and then decoded.

In the case for example of the H264/MPEG-4 AVC (standing for "Advanced Video Coding") standard, the predictive coding of a macroblock consists in splitting the macroblocks according to a plurality of partitions generally having the shape of blocks of smaller size.

More precisely in the case of the inter coding in accordance with the aforementioned standard, the current macroblock to be coded may be partitioned according to the 16×16, 8×16, 16×8 and 8×8 modes. If the 8×8 mode is selected, each 8×8 block is again partitioned according to the 8×8, 4×8, 8×4 and 4×4 modes. Each current block is compared with one or more blocks respectively of one or more reference images. A motion vector is then obtained which describes the motion between the current block and the reference block having the same position as the current macroblock in the previous image. A predictor of this motion vector is then calculated so as to code the residual between the aforementioned motion vector and the calculated predictor motion vector.

Such a prediction of the motion vector is not suited to all the types of partitioning and in particular in the case where the reference macroblock overlaps several reference partitions of the reference image. Such a situation is represented in FIG. 1A which illustrates the case of a temporal prediction for a current macroblock to be coded, denoted $MBC_N$, of an image N to be coded in accordance with the aforementioned standard. In the example represented, such a macroblock $MBC_N$ has a square shape and is of 4×4 type. The macroblock $MBC_N$ is surrounded by other macroblocks BR1, BR2, BR3, BR4 which are situated in the neighborhood closest to the latter and which have the same shape and size as those of the macroblock $MBC_N$.

In the example represented, the motion vector of the current macroblock $MBC_N$, denoted MV, points at a reference macroblock $MBC_{N-1}$ of a reference image, denoted N−1, which is for example the previous image. The reference macroblock $MBC_{N-1}$ has the same position as the current macroblock $MBC_N$ in the previous image N−1. A particular feature of the reference macroblock $MBC_{N-1}$ is that it overlaps already coded and then decoded reference partitions, denoted BR'1, BR'2, BR'3 and BR'4 in FIG. 1A.

In application of the H264/AVC standard, the aforementioned motion vector MV is predicted spatially only. More precisely, the calculation is undertaken of a reference motion vector which is equal to a median of the motion vectors MV1, MV3, MV4, associated respectively with the reference macroblocks BR1, BR3, BR4. In certain situations, the motion vector MV2, associated with the reference macroblock BR2, may be used in place of one of the vectors MV1, MV3, MV4.

Moreover, new types of partitioning of the current macroblock to be coded have recently appeared, which had not been provided for in the H264/AVC standard. Thus, as represented in FIG. 1B, a current macroblock to be coded $MBC_N$ may be split up into several partitions P1 to Pp of linear shape, L-shaped, or else of entirely arbitrary shape.

The H264/AVC standard does not provide for any prediction suited to the various types of partitioning of FIG. 1B and to the particular case where the reference macroblock thus partitioned overlaps several partitions of the reference image. Such a situation is represented in FIG. 1C which illustrates the case of a temporal prediction for a current macroblock to be coded, denoted $MBC_N$, of an image N to be coded in accordance with the aforementioned standard. In the example represented, such a macroblock $MBC_N$ is split according to three smaller partitions P1, P2, P3, which are of arbitrary geometric shape.

In the example represented, the motion vector of the first partition P1 of the current macroblock $MBC_N$, denoted MVp1, points at a partition P'1 of a reference macroblock $MBC_{N-1}$ of a reference image N−1 having the same position as the current macroblock $MBC_N$ in the previous image N−1. A particular feature of the reference macroblock $MBC_{N-1}$ is that it overlaps already coded and then decoded reference partitions, denoted BR'1, BR'2, BR'3 and BR'4 in FIG. 1C.

In application of the H264/AVC standard, to predict the aforementioned motion vector MVp1, the calculation is undertaken of a reference motion vector which is generally equal to a spatial median of the motion vectors MV1, MV3, MV4, associated respectively with the reference macroblocks BR1, BR3, BR4.

Such a spatial prediction of the motion vector may turn out to lack precision having regard to the fact that in the image N−1, there exists a difference in shape and in size between the reference partition P'1 and the reference macroblocks BR'1, BR'2, BR'3 and BR'4.

Other schemes for calculating the predictor motion vector with a view to Inter-coding the partitions of a current macroblock are moreover known.

One of them is described in the publication *IEEE Transactions on Circuits and System for Video Technology*, Vol. 18, 1247-1257 (September 2008), by G Laroche, J. Jung, and B. Pesquet-Popescu and relates to the cases where, as in the H264/AVC standard, the macroblocks are split according to a plurality of partitions generally having the shape of blocks of smaller size. According to this scheme, the motion vector of a macroblock of a current image is predicted with respect to a reference vector which is chosen as being the vector pointing to the pixel situated at the top and furthest on the left of the macroblock having the same position as the current macroblock in a previous image.

If one attempts to apply the latter scheme to the prediction of the vector MV of FIG. 1A or to that of the vector MVp1 of FIG. 1C, the vectors MV and MVp1 will each be obtained on the basis of a reference motion vector which is equal to the motion vector MV'2 associated with the reference macroblock BR'2, the pixel furthest on the left of the reference macroblock $MBC_{N-1}$ being situated in the reference macroblock BR'2 with which the motion vector MV'2 is associated.

The motion vector prediction obtained with this scheme also lacks precision for the same reasons as those mentioned above.

SUMMARY

According to a first aspect, an embodiment of the present invention relates to a method for predicting a motion vector of a current image partition with respect to a motion vector of a reference partition having the same shape as the current partition and belonging to a reference image which is different from the current image and which has been previously split, on completion of a coding followed by a decoding, into a plurality of n partitions.

According to an embodiment of the invention, in the case where the reference partition overlaps a set of k reference partitions from among the plurality of n partitions of the reference image, with k≤n, the motion vector of the current image partition is determined on the basis of a function of at least one reference motion vector belonging to a set of k reference motion vectors associated respectively with the k overlapped reference partitions.

Such an arrangement thus makes it possible to significantly improve the precision of the prediction, by taking account:
of the particular partitioning of the current macroblock or of the reference macroblock,
of the zones overlapped solely by the reference partitions.

The prediction according to an embodiment of the invention is moreover adaptable to any type of scheme for calculating the predicted motion vector of the current partition, such as in particular that in accordance with the H264/AVC standard and that described in the aforementioned IEEE publication.

In one embodiment, the determination of the motion vector of the current partition comprises the steps of:
calculation of the number of common pixels shared between the reference partition and respectively the k overlapped reference partitions,
comparison of the calculated number of common pixels shared between the k overlapped reference partitions, on the basis of a predetermined comparison criterion.

Such an arrangement thus makes it possible to select a very precise reference motion vector on the basis of a certain characteristic which is based here on the common quantity of pixels shared between the reference partition and the overlapped reference partitions.

According to a first variant, the comparison criterion consists of a selection, from among the k reference motion vectors associated respectively with the k overlapped reference partitions, of the reference motion vector which is associated with the reference partition whose calculated common number of pixels is the highest.

According to a second variant, the comparison criterion consists of a weighting, by the calculated common number of pixels, of the mean of the k reference motion vectors associated respectively with the k overlapped reference partitions.

According to a third variant, the comparison criterion consists of a selection, from among the k reference motion vectors associated respectively with the k overlapped reference partitions, of the reference motion vector which is associated with the overlapped reference partition which has the most pixels inside the reference partition than outside the latter.

In another embodiment, the determination of the motion vector of the current partition comprises the steps of:
calculation, for each of the k overlapped reference partitions, of a coefficient which is dependent on the spatial gradient of the reference partition,
selection of the coefficient whose calculated value is the highest,
selection of the reference motion vector which corresponds to the overlapped reference partition whose coefficient has been selected.

Such an arrangement thus makes it possible to select a very precise reference motion vector on the basis of a certain characteristic which is based here on the calculation of a coefficient which expresses a degree of confidence in the choice of the reference motion vector which is assumed to be more precise in a zone of the image which contains discontinuities than in a zone of the image that is homogeneous.

According to a variant, the motion vector of the current partition is determined subsequent to a step of calculating the mean of the k reference motion vectors associated respectively with the k overlapped reference partitions, such a mean being weighted by the k calculated coefficients.

In another embodiment, the determination of the motion vector of the current partition comprises the steps of:
selection of a particular point of the reference partition,
selection of the reference motion vector associated with the overlapped reference partition which contains the particular point selected.

Such an arrangement thus makes it possible to select a very precise reference motion vector on the basis of a certain characteristic which is based here on an evaluation of the positioning of the reference partition with respect to the k overlapped reference partitions.

In another embodiment, the determination of the motion vector of the current partition comprises the steps of:
identification, in the reference partition, of a characteristic relating to the content of the image,
selection of the reference motion vector associated with the overlapped reference partition which contains said characteristic.

Such an arrangement thus makes it possible to select a very precise reference motion vector on the basis of a certain characteristic which is based here on the identification of a pattern, of a color, of a contour, etc. in the reference partition.

According to a second aspect, an embodiment of the present invention relates to a method for coding an image or a sequence of images generating a data stream comprising data representative of at least one image partition, such a method comprising a step of predicting a motion vector of the image partition.

According to an embodiment of the invention, the prediction step of such a coding method is performed in accordance with the aforementioned prediction method.

According to a third aspect, an embodiment of the present invention relates to a method for decoding a data stream representative of an image or of a sequence of images, the stream comprising data representative of at least one image partition, such a method comprising a step of predicting a motion vector of the image partition.

According to an embodiment of the invention, the prediction step of such a decoding method is performed in accordance with the aforementioned prediction method.

Correlatively, according to a fourth aspect, an embodiment of the present invention relates to a device for predicting a motion vector of a current image partition with respect to a motion vector of a reference partition having the same shape as said current partition and belonging to a reference image which is different from the current image and which has been previously split, on completion of a coding followed by a decoding, into a plurality of n partitions.

According to an embodiment of the invention, in the case where the reference partition overlaps a set of k reference partitions from among the plurality of n partitions of the reference image, with k≤n, such a prediction device comprises a calculation module able to determine the motion vector of the current image partition on the basis of a function of at least one reference motion vector belonging to a set of k reference motion vectors associated respectively with the k overlapped reference partitions.

Correlatively, according to a fifth aspect, an embodiment of the present invention relates to a device for coding an image or a sequence of images generating a data stream comprising data representative of at least one image partition, such a device comprising means for predicting a motion vector of the image partition.

According to an embodiment of the invention, the prediction device of such a coding device conforms to the aforementioned prediction device.

Correlatively, according to a sixth aspect, an embodiment of the present invention relates to a decoding device for decoding a data stream representative of an image or of a sequence of images, the stream comprising data representative of at least one image partition, such a device comprising means for predicting a motion vector of the image partition.

According to an embodiment of the invention, the prediction device of such a decoding device conforms to the aforementioned prediction device.

An embodiment of the invention further relates to a computer program comprising instructions for implementing one of the methods according to an embodiment of the invention, when it is executed on a computer.

The coding method, the decoding method, the prediction device, the coding device and the decoding device exhibit at least the same advantages as those conferred by the prediction method according to an embodiment of the present invention.

BRIEF DESCRIPTION OF THE DRAWINGS

Other characteristics and advantages will become apparent on reading a preferred embodiment described with reference to the figures in which:

FIG. 4 represents an exemplary temporal prediction according to an embodiment of the invention which utilizes the temporal correlations between the current macroblock to be coded of a current image and the reference macroblocks of a previous image, FIG. 5 represents a decoding device according to an embodiment of the invention, FIG. 6 represents steps of the decoding method according to an embodiment of the invention.

DETAILED DESCRIPTION OF AN EMBODIMENT

An embodiment of the invention will now be described, in which the coding method is used to Inter-code a sequence of images according to a binary stream much like that which is obtained via a coding according to the H.264/MPEG-4 AVC standard. In this embodiment, the coding method is for example implemented in a software or hardware manner by modifications of a coder initially complying with the H.264/MPEG-4 AVC standard. The coding method according to the invention is represented in the form of an algorithm comprising steps C0 to C7, represented in FIG. 2.

Figure 3:
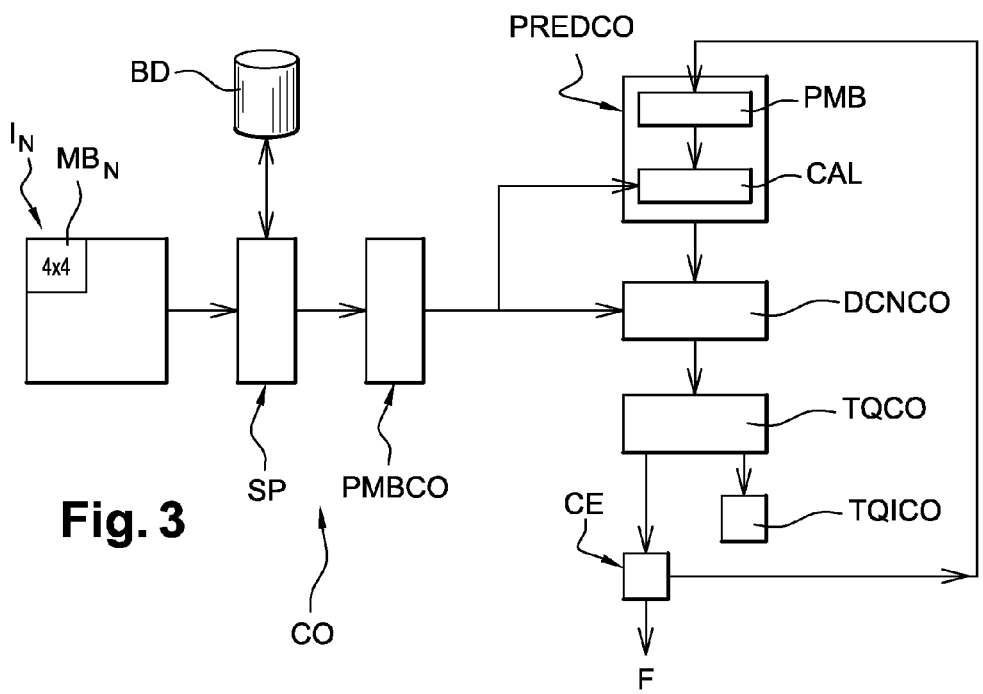
FIG. 3 represents a coding device according to an embodiment of the invention.

The coding method according to an embodiment of the invention is implemented in a coding device C0 represented in FIG. 3.

Figure 1A:
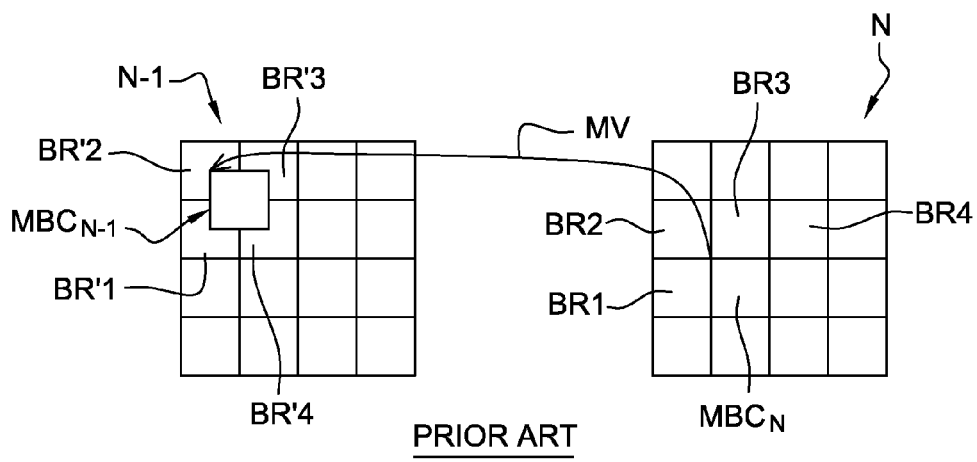
FIG. 1A represents an exemplary temporal prediction of the prior art which utilizes the temporal correlations between a current macroblock to be coded of an image N and a reference macroblock of a previous image N−1, the reference macroblock having a square shape and overlapping several neighbor reference macroblocks.
Figure 1B:
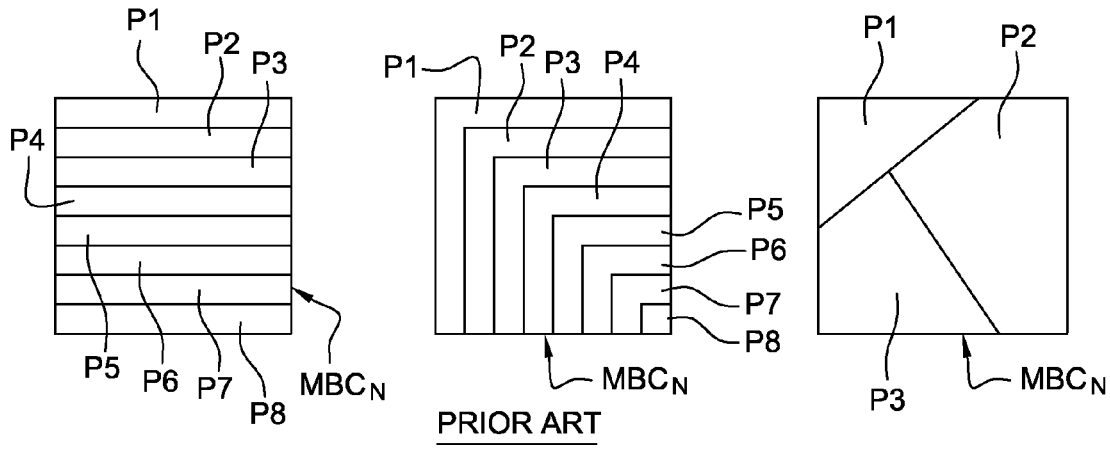
FIG. 1B represents a macroblock split according to various types of partitions of the prior art.
Figure 1C:
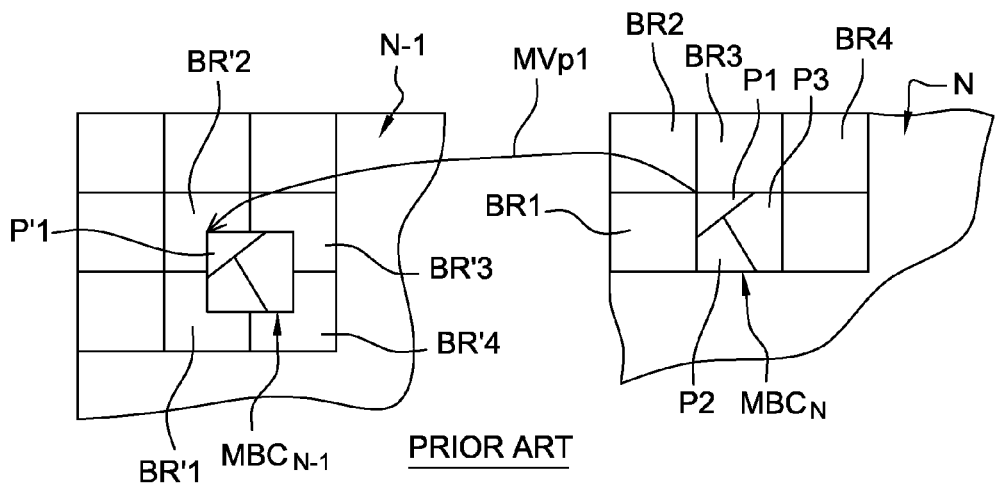
FIG. 1C represents an exemplary temporal prediction of the prior art which utilizes the temporal correlations between a current macroblock to be coded of an image N and a reference macroblock of a previous image N−1, the reference macroblock being split according to several partitions of arbitrary shape and overlapping several neighbor reference macroblocks.
Figure 2:
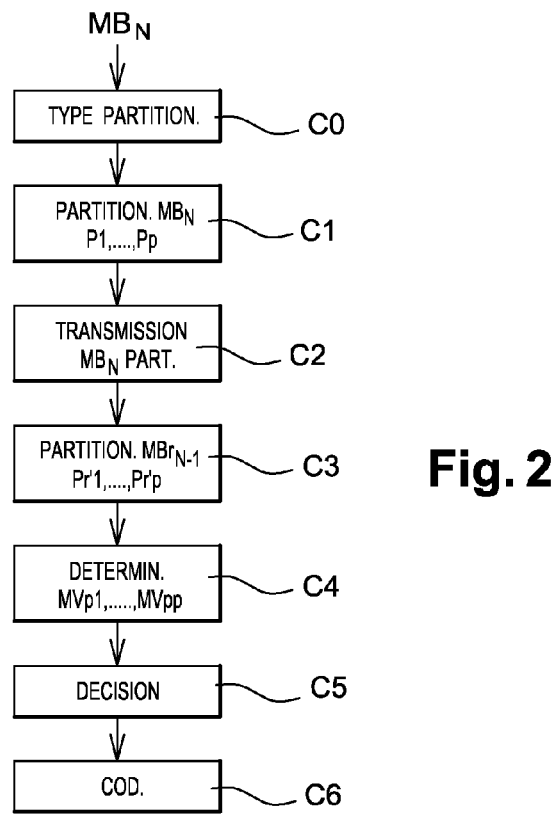
FIG. 2 represents the steps of the coding method according to an embodiment of the invention.

The first step C0, represented in FIG. 2, is the selection, for a macroblock belonging to an image of the sequence of images to be coded, denoted $I_N$ in FIG. 3, of a particular partitioning associated with this macroblock.

It should be noted that step C0 can be optional, the prediction of the motion vector of the current macroblock possibly being performed by considering the latter in its entirety, that is to say as one single partition.

In the course of step C0, a macroblock $MB_N$, for example of 4×4 size, and belonging to the image $I_N$, is applied as input to a partitioning selection module SP represented in FIG. 3.

This partitioning module SP uses for example a scheme for choosing by exhaustive competition or else a scheme for choosing with the aid of an algorithm with a-priori. Such schemes are well known to the person skilled in the art (cf: G. J. Sullivan and T. Wiegand, "Rate-distortion optimization for video compression", *IEEE Signal Proc. Mag.*, pp. 74-90, 1998). They will not therefore be described hereinafter.

The various types of possible partitioning algorithms are grouped together in a database BD of the coder CO. They make it possible to obtain a splitting of the current macroblock into a plurality of partitions either of rectangular or square shape, or of other geometric shapes, such as for example substantially linear shapes, or of entirely arbitrary shape.

In the example represented, the selection module SP selects a partitioning of arbitrary type.

The following step C1 represented in FIG. 2 is the splitting of the macroblock $MB_N$ into a number of p partitions to be predicted.

The macroblock $MB_N$ is split up into for example three partitions P1, P2 and P3 of arbitrary shape. Such a splitting is performed by a macroblocks partitioning module PMBCO represented in FIG. 3 which uses a conventional partitioning algorithm.

FIG. 4 represents the macroblock $MB_N$ which has been obtained after such a partitioning.

Subsequent to the partitioning step C1, in the course of a step C2 represented in FIG. 2, the partitioning module PMBCO transmits the macroblock $MB_N$ which has just been partitioned to a prediction module PREDCO represented in FIG. 3.

In a conventional manner, such a prediction module PREDCO is intended to predict the current macroblock $MB_N$ partitioned with respect to an already coded and then decoded reference macroblock, denoted $MBr_{N-1}$ in FIG. 4, which has the same position as the current macroblock $MB_N$ in a previous image $I_{N-1}$ which has been previously split on completion of a coding followed by a decoding, into a plurality of n partitions r'1, r'2, . . . , r'n.

In accordance with an embodiment of the invention, the reference macroblock $MBr_{N-1}$ overlaps a set of k reference partitions r'1, r'2, . . . r'k, with k≤n. In the example represented, the reference macroblock $MBr_{N-1}$ partially overlaps the four reference partitions r'1, r'2, r'3 and r'4. It goes without saying that in other possible embodiments, the reference macroblock $MBr_{N-1}$ can completely overlap one or more of the reference partitions r'1, r'2, r'3 and r'4.

With reference to FIG. 3, such a reference macroblock $MBr_{N-1}$ is coded in accordance with the H.264/MPEG-4AVC standard, that is to say it undergoes, in a manner known per se:
  a coding by discrete cosine transform and quantization which is performed by a transform and quantization module TQCO,
  and then a decoding by inverse discrete cosine transform and inverse quantization, which is performed by the inverse transform and quantization module TQICO.

Still with reference to FIG. 3, the prediction module PREDCO comprises, according to an embodiment of the invention:
  a partitioning module PMB intended to split the reference macroblock $MBr_{N-1}$ according to a plurality of reference partitions, a calculation module CAL intended to calculate each motion vector MVp1, MVp2, . . . , MVpp which are associated respectively with the partitions P1, P2, . . . , Pp of the current macroblock $MB_N$, on the basis of a function of at least one reference motion vector belonging to a set of k reference motion vectors MVr'1, MVr'2, . . . , MVr'k which are associated respectively with the k overlapped reference partitions r'1, r'2, . . . , r'k.

In the course of step C3 represented in FIG. 2, the partitioning module PMB of FIG. 3 undertakes the splitting of the reference macroblock $MBr_{N-1}$ according to p reference partitions. In the example represented in FIG. 4, the reference macroblock $MBr_{N-1}$ is split in a manner identical to the current macroblock $MB_N$, i.e. according to three partitions Pr'1, Pr'2 and Pr'3 which are all of different shape and size.

In the course of step C4 represented in FIG. 2, the calculation module CAL of FIG. 3 calculates, for each current partition P1, P2 and P3, the predicted motion vector MVp1, MVp2 and MVp3 which is associated therewith, according to the various schemes described hereinbelow according to an embodiment of the invention.

According to a first scheme, the module CAL determines the predicted motion vector MVp1 of the current partition P1 as a function of the reference motion vectors MVr'1, MVr'2, MVr'3 and MVr'4 associated respectively with the four overlapped reference partitions r'1, r'2, r'3 and r'4 represented in FIG. 4. Such a determination consists for example in calculating the mean of the reference motion vectors MVr'1, MVr'2, MVr'3 and MVr'4 in accordance with the equation hereinbelow:

$$MVp1 = Moy(MVr'1, MVr'2, MVr'3, MVr'4)$$

According to a second scheme, with reference to FIG. 4, the module CAL determines the predicted motion vector MVp1 as being equal to the reference motion vector associated with the overlapped reference partition having the largest number of pixels in common with the reference partition Pr'1 of the reference macroblock $MBr_{N-1}$.

In the example represented in FIG. 4, MVp1=MVr'2.

According to a first variant of this second scheme, the module CAL determines the predicted motion vector MVp1 as being equal to the reference motion vector associated with the overlapped reference partition which has the largest percentage of pixels in common with the reference partition Pr'1 of the reference macroblock $MBr_{N-1}$.

In the example represented in FIG. 4, MVp1=MVr'2.

According to a second variant of this second scheme, the module CAL determines a mean of the reference motion vectors MVr'1, MVr'2, MVr'3 and MVr'4 which is weighted by the common number of pixels shared between the reference partition Pr'1 of the macroblock $MBr_{N-1}$ and each of the overlapped reference partitions r'1, r'2, r'3 and r'4. Such a determination amounts to calculating the predicted motion vector MVp1 in accordance with the equation hereinbelow:

$$MVp1 = \frac{1}{T}\left[\sum_{k=1}^{K}\lceil pr'1 \cap r'_k \rceil \cdot MVr'k\right]$$

with:
K=4,
T representing the number of pixels constituting the reference macroblock $MBr_{N-1}$,
⌈Pr'1 ∩r'k⌉ representing the common number of pixels shared between the reference partition Pr'1 of the macroblock $MBr_{N-1}$ and each of the overlapped reference partitions r'1, r'2, r'3 and r'4.

In the example represented in FIG. 4, MVp1=MVr'2.

By way of alternative, the aforementioned mean may be weighted by the number of common pixels less the number of non-common pixels.

Another alternative consists in weighting the mean by the percentage of pixels in common between the partition Pr'1 of the reference macroblock $MBr_{N-1}$ and each of the reference partitions r'1, r'2, r'3 and r'4.

Still another alternative is to determine the predicted motion vector MVp1 as being equal to the reference motion vector associated with the overlapped reference partition which has the most pixels inside Pr'1 than outside Pr'1.

According to a third scheme, with reference to FIG. 4, the calculation module CAL:

determines, for each of the k overlapped reference partitions r'1, r'2, r'3, r'4, a coefficient $C_k$ (with k=4) which is dependent on the spatial gradient g of said reference partition Pr'1, selects the coefficient $C_j$ (with 1≤j≤k) whose calculated value is the highest, in accordance with the equation hereinbelow:

$$C_j = \underset{k}{\operatorname{argmax}}\{C_k\} \text{ where}$$

$$C_k = \frac{1}{\lceil Pr'1 \cap r'_k \rceil} \sum_{i=1}^{\lceil Pr'1 \cap r'_k \rceil} \sqrt{g_x^2(i) + g_y^2(i)}$$

This third scheme proposes a first alternative according to which the calculation module CAL determines the predicted motion vector MVp1 as being equal to the reference motion vector associated with the overlapped reference partition corresponding to the calculated coefficient $C_j$.

This third scheme proposes a second alternative according to which the calculation module CAL determines the predicted motion vector MVp1 as being equal to the mean of the reference motion vectors MVr'1, MVr'2, MVr'3 and MVr'4 which is weighted by the calculated coefficients $C_1$, $C_2$, $C_3$, $C_4$.

According to a fourth scheme, with reference to FIG. 4, the calculation module CAL firstly identifies a particular point of the reference partition Pr'1, for example the center of the latter, denoted CTr'1. The center CTr'1 is calculated by means of an algorithm which minimizes the sum of the distances with respect to all the points of the reference partition Pr'1.

Secondly, the calculation module CAL determines the predicted motion vector MVp1 as being equal to the reference motion vector associated with the overlapped reference partition which contains the particular point selected, i.e. the center CTr'1. In the example represented, it is the reference partition r'2 which contains the center CTr'1 and therefore MVp1=MVr'2.

According to a fifth scheme, with reference to FIG. 4, the calculation module CAL firstly identifies, in the reference partition Pr'1, a particular characteristic relating to the content of the image. In the example represented, such a characteristic is illustrated by a cross inlaid in the image $I_{N-1}$, denoted Clr'1.

Secondly, the calculation module CAL determines the predicted motion vector MVp1 as being equal to the reference motion vector associated with the overlapped reference partition which contains the selected characteristic, i.e. the cross Clr'1. In the example represented, it is the reference partition r'1 which contains the cross Clr'1 and therefore MVp1=MVr'1.

By way of an alternative to this fifth scheme, the characteristic relating to the content of the image may be a particular color, a particular pattern, a contour which crosses the reference partition Pr'1, or other particular features of the image breaking the homogeneity of the latter.

On completion of said calculation step C4 according to one or the other of the aforementioned schemes according to an embodiment of the invention, the prediction calculation module PREDCO then delivers a first predicted vector MVp1 which, in the case where the latter is retained by the coder CO as being the optimal motion vector type, is immediately coded by the transform and quantization module TQCO, and then decoded by the inverse transform and quantization module TQICO, which are represented in FIG. 3.

Aforementioned step C4 is thereafter repeated so as to predict the other motion vectors MVp2 and MVp3 which are associated respectively with the partitions P2 and P3 of the current macroblock $MB_N$.

Once various possible predictions have been calculated by the prediction calculation module PREDCO, in the course of a step C5 represented in FIG. 2, a decision module DCNCO, represented in FIG. 3, traverses the partitioned macroblocks of the image $I_N$ and chooses, in this step C5, the mode of prediction used to code each of these macroblocks. From among the possible predictions for a macroblock, the decision module DCNCO chooses the optimal prediction according to a distortion rate criterion well known to the person skilled in the art.

With reference to FIG. 2, each predicted macroblock is coded, in the course of a step C6, as in the H.264/MPEG-4 AVC standard.

With reference to FIG. 3, once this structural coding has been performed by the decision module DCNCO, the coefficients of residuals if they exist, corresponding to the blocks of the image $I_N$, are dispatched to the transform and quantization module TQCO, to undergo discrete cosine transforms followed by a quantization. The slices of macroblocks with these quantized coefficients are thereafter transmitted to an entropy coding module CE represented, so as to produce, with the other images of the video sequence that have already been coded in the same manner as the image $I_N$, a binary video stream F coded according to an embodiment of the invention.

The binary stream F thus coded is transmitted by a communication network, to a remote terminal. The latter comprises a decoder DO according to an embodiment of the invention, represented in FIG. 5.

The binary stream F is firstly dispatched to an entropy decoding module DE, the decoding inverse to that performed by the entropy coding module CE represented in FIG. 3. Next, for each image macroblock to be reconstructed, the coefficients decoded by the module DE are dispatched to an inverse quantization and inverse transform module QTIDO.

An image reconstruction module RI then receives decoded data corresponding to the data produced by the module DCNCO (FIG. 3) in coding step C5 according to an embodiment of the invention, to within transmission errors. The module RI implements steps D0 to D6, such as represented in FIG. 6, of the decoding method according to an embodiment of the invention. Such a decoding method according to an embodiment of the invention is also implemented in a software or hardware manner by modifications of a decoder initially complying with the H.264/MPEG-4 AVC standard.

The first step D0 is the decoding of data structures coded in a slice of a current macroblock of the image $I_N$ to be decoded. In a manner known per se, the reconstruction module RI determines on the basis of the data of said macroblock slice:

the type of coding of said data, Intra or Inter: Inter according to an embodiment of the invention, the type of partitioning of the macroblock to be reconstructed, Inter 4×4, 8×8, line, etc. . . . : Inter 4×4 in the embodiment described, the index of the optimal predictor such as selected by the decision module DCNCO in aforementioned step C5.

The following step D1 represented in FIG. 6 is the splitting of the current macroblock to be decoded, in accordance with the partitioning determined in step D0. For this purpose, with reference to FIG. 5, a macroblocks partitioning module PMBDO, which in all respects resembles that represented in FIG. 3, splits the macroblock into a plurality of p partitions, i.e. three partitions of arbitrary shape in the example represented.

In the course of a step D2 represented in FIG. 6, the partitioning module PMBDO transmits the current macroblock to be decoded and which has just been partitioned into p=3 partitions, to a prediction module PREDDO represented in FIG. 5, which is in all respects similar to the prediction module PREDCO of the coder CO of FIG. 3, and which, for this reason, will not be described again in detail.

In the course of steps D3 and D4 represented in FIG. 6, the prediction module PREDDO of FIG. 5 performs the same algorithm as that performed by the prediction module PREDCO of the aforementioned coder CO, so as to obtain a current macroblock whose associated motion vectors have been predicted in accordance with one or the other of the schemes described hereinabove.

In the course of a step D5, a decision module DCNDO chooses the optimal prediction according to a distortion rate criterion well known to the person skilled in the art.

Each predicted macroblock is thereafter decoded, in the course of a step D6, as in the H.264/MPEG-AVC standard.

Once all the macroblocks of the image $I_N$ have been decoded, with reference to FIG. 5, the image reconstruction module RI provides as output from the decoder DO, an image $ID_N$ corresponding to the decoding of the image $I_N$. Having regard to the fact that the prediction algorithm performed at the decoder DO is in every respect the same as that performed at the coder CO, the information cost induced by the predictors used is greatly reduced.

It goes without saying that the embodiments which have been described hereinabove have been given purely by way of wholly non-limiting indication, and that numerous modifications may easily be made by the person skilled in the art without however departing from the scope of the invention.

The invention claimed is:

1. A method comprising:
predicting a motion vector of a current image partition of a current image with respect to a motion vector of a reference partition having the same shape as said current image partition and belonging to a reference image which is different from the current image and which has been previously split, on completion of a coding followed by a decoding, into a plurality of n partitions, and in a case where said reference partition overlaps a set of k reference partitions from among said plurality of n partitions of the reference image, with k≤n, determining with a prediction device said motion vector of the current image partition on the basis of a function of at least one reference motion vector belonging to a set of k reference motion vectors associated respectively with the k overlapped reference partitions, in which determining the motion vector of the current partition comprises:
selecting a particular point at the center of the reference partition that overlaps said set of k reference partitions, wherein the particular point minimizes the sum of the distances with respect to all the points of the reference partition; and
selecting the reference motion vector associated with the overlapped reference partition which contains the particular point selected.

2. The method as claimed in claim 1, in which the determining the motion vector of the current partition comprises the steps of:
calculating the number of common pixels shared between the reference partition and respectively the k overlapped reference partitions,
comparing the calculated number of common pixels shared between the k overlapped reference partitions, on the basis of a predetermined comparison criterion.

3. The method as claimed in claim 2, in which the comparison criterion comprises a selection, from among the k reference motion vectors associated respectively with the k overlapped reference partitions, of the reference motion vector which is associated with the reference partition whose calculated common number of pixels is the highest.

4. The method as claimed in claim 2, in which the comparison criterion comprises a weighting, by the calculated common number of pixels, of the mean of the k reference motion vectors associated respectively with the k overlapped reference partitions.

5. The method as claimed in claim 2, in which the comparison criterion comprises a selection, from among the k reference motion vectors associated respectively with the k overlapped reference partitions, of the reference motion vector which is associated with the overlapped reference partition which has the most pixels inside the reference partition than outside the latter.

6. The method as claimed in claim 1, in which determining the motion vector of the current partition comprises the steps of:
calculating, for each of the k overlapped reference partitions, a coefficient which is dependent on the spatial gradient of said reference partition,
selecting the coefficient whose calculated value is the highest,
selecting the reference motion vector which corresponds to the overlapped reference partition whose coefficient has been selected.

7. The method as claimed in claim 1, in which determining the motion vector of the current partition comprises the steps of:
calculating, for each of the k overlapped reference partitions, a coefficient which is dependent on the spatial gradient of said reference partition,
calculating the mean of the k reference motion vectors associated respectively with the k overlapped reference partitions, said mean being weighted by said k calculated coefficients.

8. The method as claimed in claim 1, in which determining the motion vector of the current partition comprises the steps of:
identifying, in the reference partition, a characteristic relating to the content of the image,
selecting the reference motion vector associated with the overlapped reference partition which contains said characteristic.

9. The method of claim 1, which further comprises:
coding the current image or a sequence of images generating a data stream comprising data representative of at least one image partition, including said current image partition, wherein coding comprises the step of predicting the motion vector of said current image partition.

10. The method of claim 1, which further comprises:
decoding a data stream representative of the current image or of a sequence of images, said stream comprising data representative of at least one image partition, including said current image partition, wherein decoding comprises the step of predicting the motion vector of said current image partition.

11. A device for predicting a motion vector of a current image partition of a current image with respect to a motion vector of a reference partition having the same shape as said current image partition and belonging to a reference image which is different from the current image and which has been previously split, on completion of a coding followed by a decoding, into a plurality of n partitions, the device comprising:

a calculation module, which is configured to determine the motion vector of the current image partition, in a case where said reference partition overlaps a set of k reference partitions from among said plurality of n partitions of the reference image, with k≤n, on the basis of a function of at least one reference motion vector belonging to a set of k reference motion vectors associated respectively with the k overlapped reference partitions, in which the calculation module is configured to determine the motion vector of the current partition by:

selecting a particular point at the center of the reference partition that overlaps said set of k reference partitions, wherein the particular point minimizes the sum of the distances with respect to all the points of the reference partition; and selecting the reference motion vector associated with the overlapped reference partition which contains the particular point selected.

12. The device of claim 11, wherein the device further comprises:

a coding device, which is configured to code the current image or a sequence of images generating a data stream comprising data representative of at least one image partition, including the current image partition, wherein said coding device comprises the calculation module.

13. The device of claim 11, wherein the device further comprises:

a decoding device, which is configured to decode a data stream representative of the current image or of a sequence of images, said data stream comprising data representative of at least one image partition, including the current image partition, wherein said decoding device comprises the calculation module.

14. A non-transitory computer-readable medium comprising a computer program stored thereon comprising instructions for implementing, when the instructions are executed on a computer, wherein the method comprises:

predicting a motion vector of a current image partition of a current image with respect to a motion vector of a reference partition having the same shape as said current image partition and belonging to a reference image which is different from the current image and which has been previously split, on completion of a coding followed by a decoding, into a plurality of n partitions, and in a case where said reference partition overlaps a set of k reference partitions from among said plurality of n partitions of the reference image, with k≤n, determining with a prediction device said motion vector of the current image partition on the basis of a function of at least one reference motion vector belonging to a set of k reference motion vectors associated respectively with the k overlapped reference partitions, in which determining the motion vector of the current partition comprises:

selecting a particular point at the center of the reference partition that overlaps said set of k reference partitions, wherein the particular point minimizes the sum of the distances with respect to all the points of the reference partition; and selecting the reference motion vector associated with the overlapped reference partition which contains the particular point selected.

* * * * *